US012637902B2

(12) United States Patent
Hawkinson et al.

(10) Patent No.: US 12,637,902 B2
(45) Date of Patent: May 26, 2026

(54) PRIVACY SYSTEM FOR SLIDING DOORS

(71) Applicant: ASSA ABLOY Accessories and Door Controls Group, Inc., Monroe, NC (US)

(72) Inventors: William Hawkinson, Germantown, TN (US); Evan McCutchen, Memphis, TN (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 806 days.

(21) Appl. No.: 17/666,666

(22) Filed: Feb. 8, 2022

(65) Prior Publication Data

US 2022/0268097 A1 Aug. 25, 2022

Related U.S. Application Data

(60) Provisional application No. 63/151,428, filed on Feb. 19, 2021.

(51) Int. Cl.
*E06B 9/24* (2006.01)
*E06B 9/02* (2006.01)

(52) U.S. Cl.
CPC . *E06B 9/24* (2013.01); *E06B 9/02* (2013.01)

(58) Field of Classification Search
CPC ..... E06B 7/16; E06B 7/18; E06B 7/20; E06B 7/205; E06B 7/21; E06B 7/22; E06B 7/23; E06B 7/2303; E06B 7/2307; E06B 7/2309; E06B 7/2312; E06B 7/2316; E06B 7/2314; E06B 2003/26352; E06B 3/88; E06B 9/24; E06B 9/02
See application file for complete search history.

(56) References Cited

U.S. PATENT DOCUMENTS

| | | | | |
|---|---|---|---|---|
| 2,485,296 A * | 10/1949 | Lescaze | E06B 3/922 49/411 | |
| 3,229,332 A | 1/1966 | Koller | | |

(Continued)

FOREIGN PATENT DOCUMENTS

| | | | |
|---|---|---|---|
| CA | 3077427 | A1 | 8/2019 |
| DE | 2462185 | A1 | 4/1976 |

(Continued)

*Primary Examiner* — Johnnie A. Shablack
(74) *Attorney, Agent, or Firm* — Moore & Van Allen PLLC; Jeffrey R. Gray

(57) ABSTRACT

A privacy system for sliding doors that that has an upper privacy assembly and side privacy assemblies for coving gaps between a sliding door and walls and/or door frames of a door opening. The upper privacy assembly has a first upper member on a door and a second upper member on a wall or frame, and the first upper member will slide with respect to the second upper member when the sliding door moves. The one or more side privacy assemblies has a first side member on the door and a second side member on the wall and/or door frame that engage and disengage. When the sliding door is in the closed position, the engagement between the first upper member and the second upper member, and the first side members and second side members, aid in restricting light from passing through gaps between the door and wall and/or frame.

14 Claims, 18 Drawing Sheets

(56) References Cited

U.S. PATENT DOCUMENTS 3,857,199 A * 12/1974 Frach .................... E06B 3/9682 49/477.1
4,112,623 A 9/1978 Mcpherson
4,157,634 A * 6/1979 Coulston ............... E06B 7/2316 49/489.1
4,192,100 A * 3/1980 Klema .................. E06B 3/4636 49/404
4,344,257 A * 8/1982 Anderson ............... E06B 3/273 49/504
4,356,856 A * 11/1982 Bengtsson .............. E06B 3/485 160/209
4,483,099 A * 11/1984 Schmidt ................ E06B 3/4618 49/63
4,538,380 A * 9/1985 Colliander ............ E06B 7/2314 49/490.1
4,604,831 A 8/1986 Tunnicliffe et al.
4,660,338 A * 4/1987 Wagner ................... E06B 5/164 49/504
4,790,108 A 12/1988 Giguere
5,356,694 A * 10/1994 Knapp ...................... E06B 7/22 428/167
5,566,505 A 10/1996 Kamezaki
5,983,570 A * 11/1999 Brown .................. E06B 3/4681 52/207
6,082,432 A * 7/2000 Kissinger .................. E06B 9/54 160/28
6,088,966 A * 7/2000 Kenkel ................... E06B 5/003 49/383
6,125,584 A 10/2000 Sanders
6,314,683 B1 * 11/2001 Vesa ..................... E06B 7/2301 49/495.1
6,371,188 B1 * 4/2002 Baczuk ..................... E06B 7/14 49/467
6,502,832 B2 1/2003 Goto et al.
6,606,831 B2 * 8/2003 Degelsegger ............. E06B 3/26 52/784.11
6,973,753 B2 * 12/2005 Liebscher ............. E06B 7/2307 49/260
7,171,785 B1 2/2007 Kelly et al.
7,174,675 B2 * 2/2007 Araneva ................... E06B 7/36 49/460
7,866,003 B2 1/2011 Tooyama
7,958,674 B2 * 6/2011 Meister ................. E06B 7/2318 49/306
8,112,954 B2 * 2/2012 Gosling .................. E05C 17/60 52/211
8,209,909 B2 7/2012 Rissone
8,256,166 B2 9/2012 Lonnberg
8,272,167 B2 9/2012 Sato
8,307,497 B2 11/2012 Chang et al.
8,839,563 B2 * 9/2014 Kalempa ............... E06B 3/4636 49/501
8,881,464 B1 * 11/2014 Huckeba ............... E06B 1/6046 49/489.1
8,915,020 B2 12/2014 Sauter
8,955,271 B2 2/2015 Keller et al.
9,745,798 B2 * 8/2017 Preising, Jr. .......... E06B 7/2314
9,855,829 B2 1/2018 Yamada et al.
9,863,178 B2 1/2018 Wang et al.
9,869,115 B2 1/2018 Nilsson
9,885,206 B2 2/2018 Shin
10,035,411 B2 7/2018 Toyota et al.
10,077,593 B2 9/2018 Meeks
10,113,356 B2 * 10/2018 Lenox ................. E05D 15/0621
10,196,854 B2 * 2/2019 Kross ......................... E06B 7/18
10,239,399 B2 3/2019 Masumoto et al.
10,450,796 B2 10/2019 Seuberling
10,455,989 B2 10/2019 Wei
10,526,839 B2 1/2020 Kling
10,563,453 B2 2/2020 Steinke
10,781,629 B2 * 9/2020 Haab ..................... E06B 7/2309
11,118,385 B2 9/2021 Hawkinson et al.
11,180,948 B2 * 11/2021 Hörlendsberger .... E06B 7/2303
11,280,130 B2 3/2022 Goldfinch et al.
11,326,393 B2 5/2022 Gosling et al.
12,006,764 B2 * 6/2024 Benotto .............. E06B 9/17076
2005/0066581 A1 * 3/2005 Rhode ................... E06B 7/2316 49/414
2010/0242365 A1 * 9/2010 Langner .............. E05D 15/0686 49/404
2012/0260579 A1 * 10/2012 DeMello ............... E06B 7/2314 49/477.1
2013/0167444 A1 7/2013 Rydn et al.
2016/0369547 A1 12/2016 Sato
2017/0253256 A1 * 9/2017 Krueger ................ E06B 7/2307
2018/0283089 A1 * 10/2018 Mertinooke .......... B29C 66/727
2019/0119967 A1 4/2019 Torrabias Cantal
2019/0309570 A1 * 10/2019 Hörlendsberger ....... B60J 10/40
2019/0368266 A1 12/2019 Goldfinch et al.
2021/0010309 A1 1/2021 Montecchio et al.
2021/0010324 A1 1/2021 Hawkinson et al.
2023/0151680 A1 * 5/2023 Praeg ......................... E06B 7/20 49/475.1

FOREIGN PATENT DOCUMENTS

DE 2811676 A1 * 3/1978
EP 0854265 B1 * 10/2004 ............. E06B 7/232
EP 2088275 A2 * 8/2009 ........... E06B 7/2307
EP 3867122 B1 * 7/2023 .............. B60J 10/24
WO WO-2009046911 A1 * 4/2009 ........... B61D 19/005

* cited by examiner

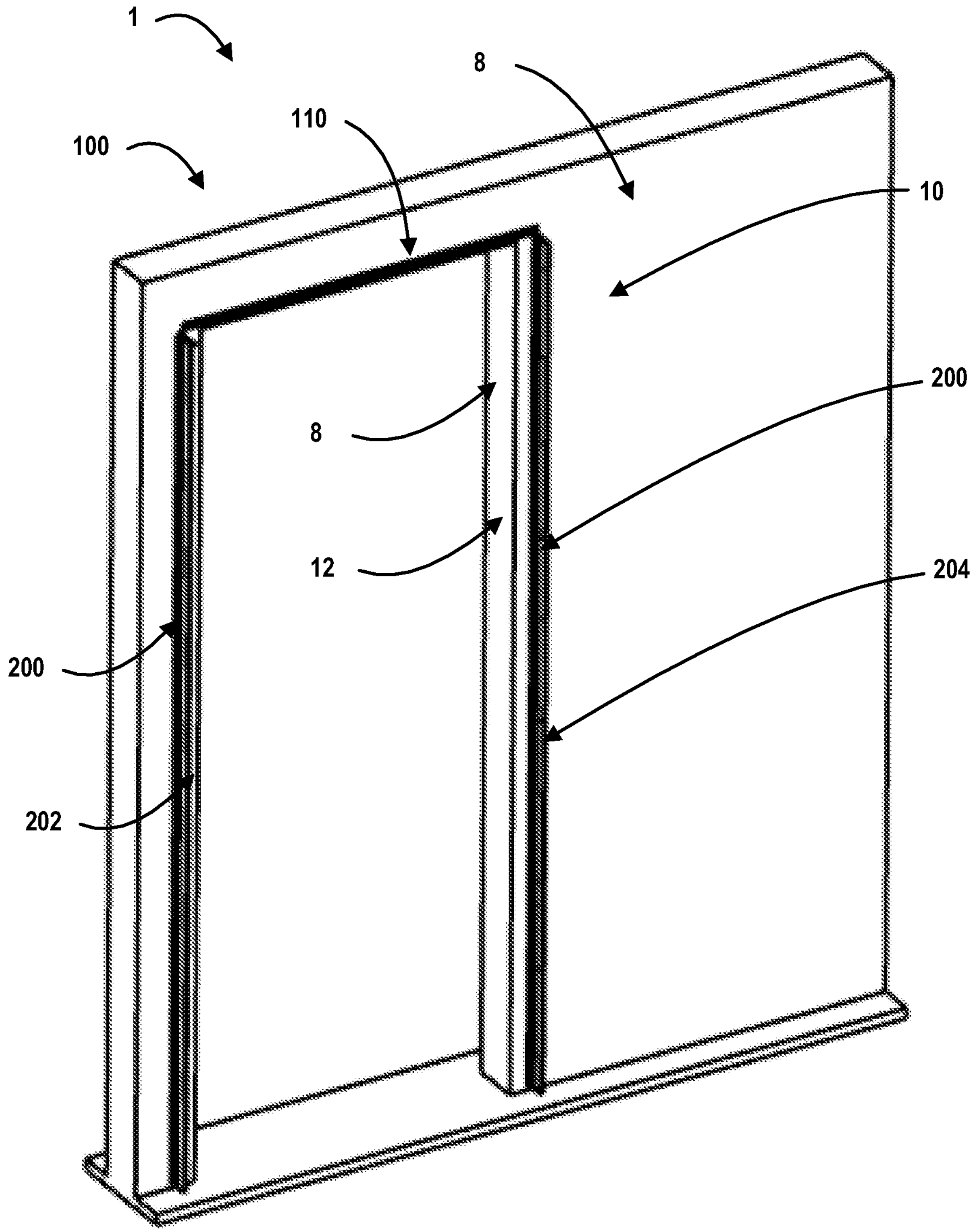
*FIG.* 3

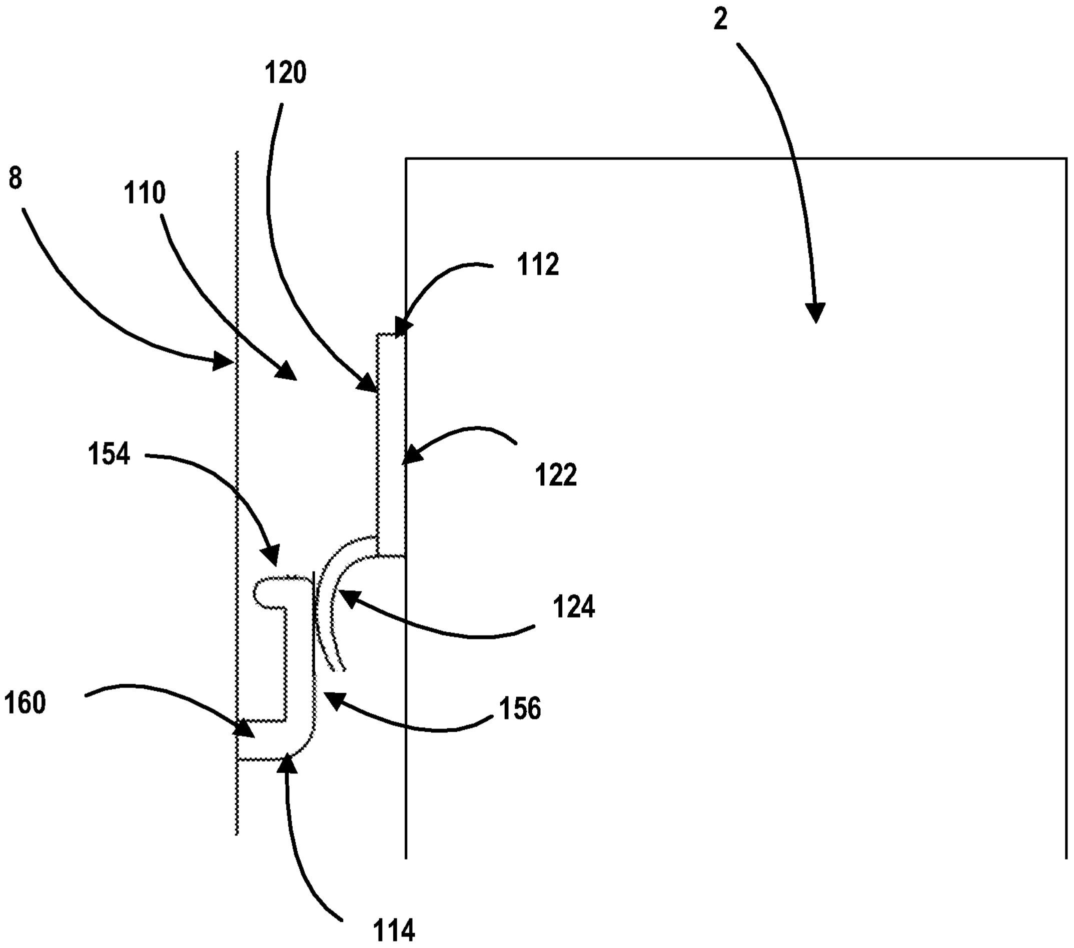
*FIG.* 8

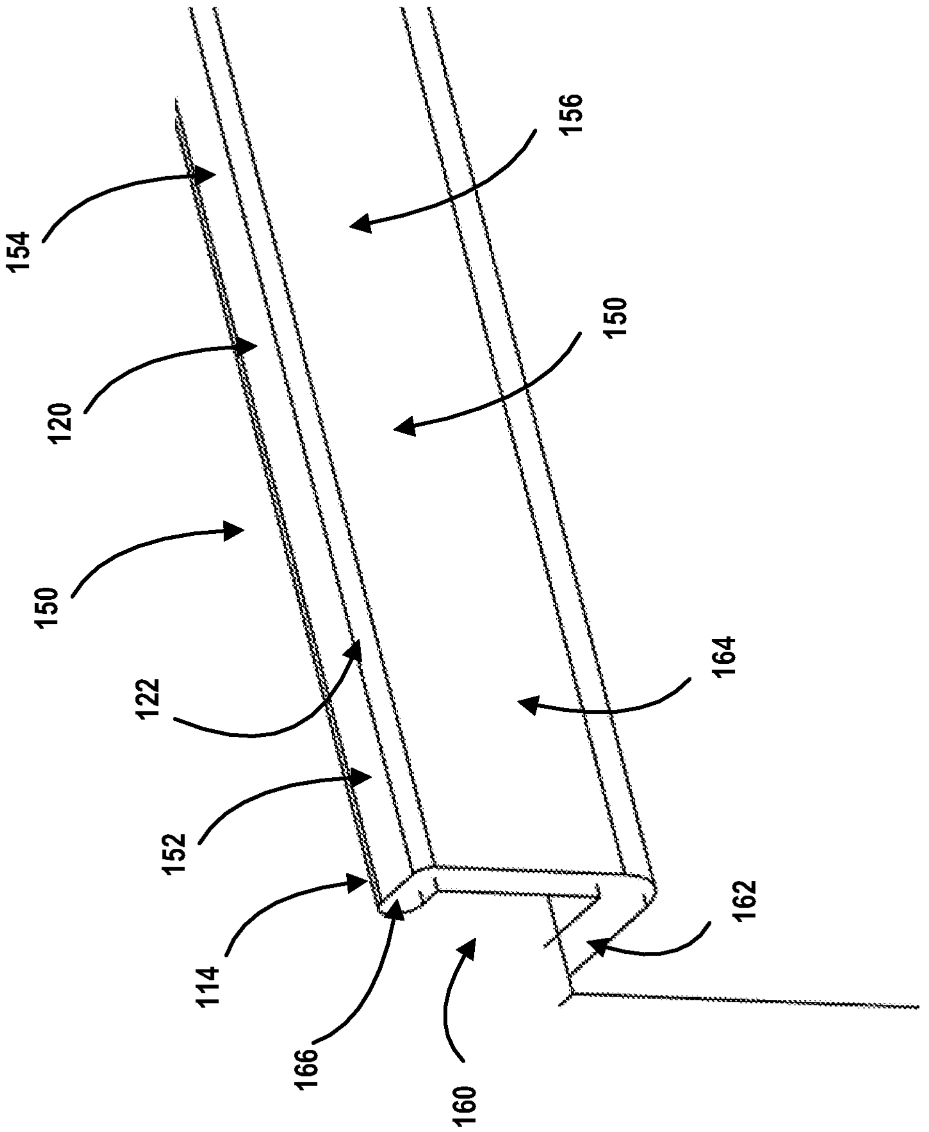
*FIG.* 10

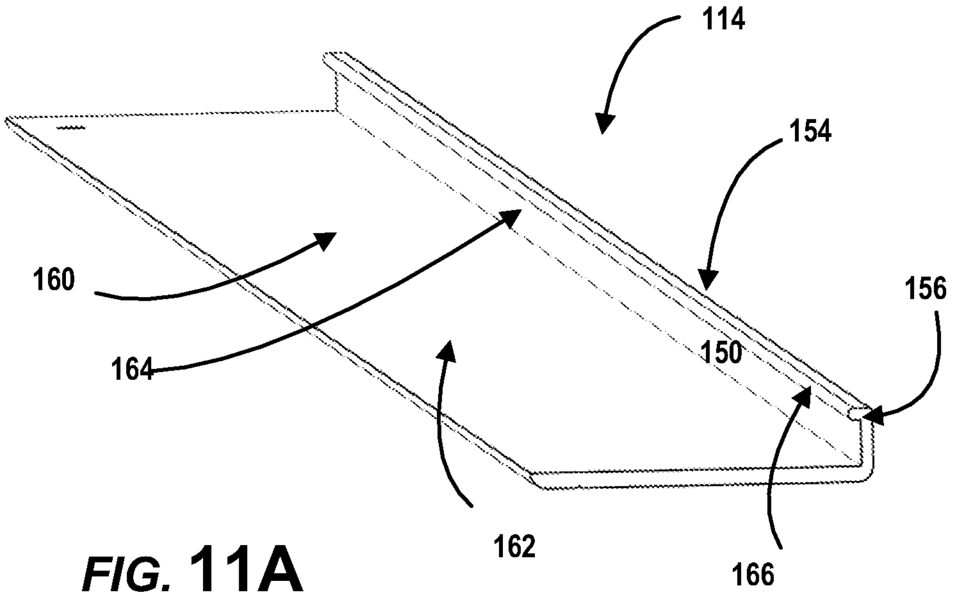
*FIG.* 11A
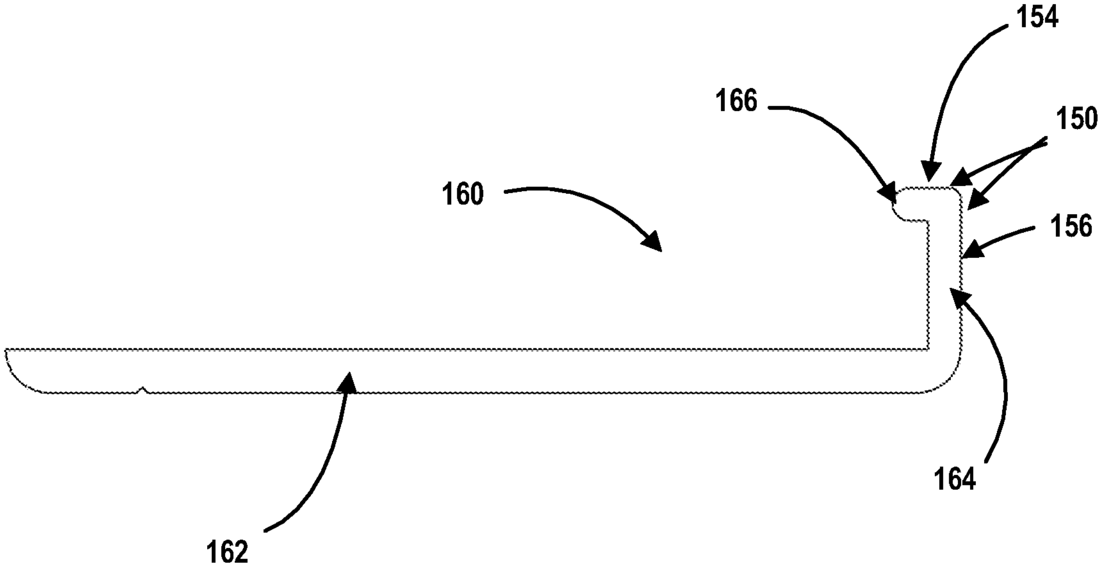
*FIG.* 11B

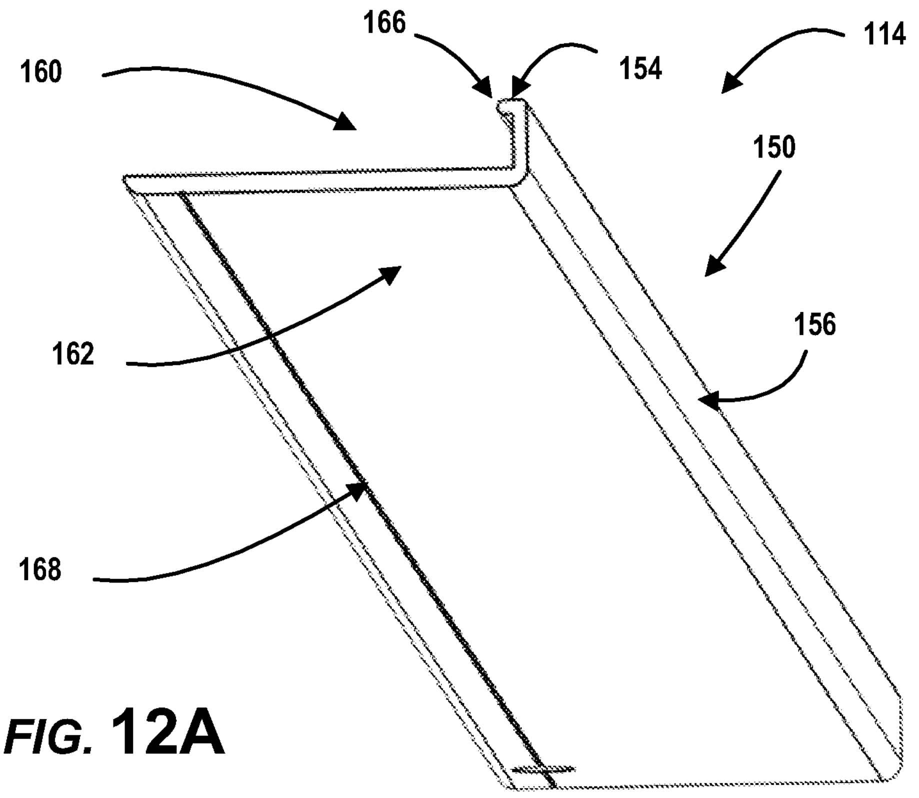
*FIG.* 12A
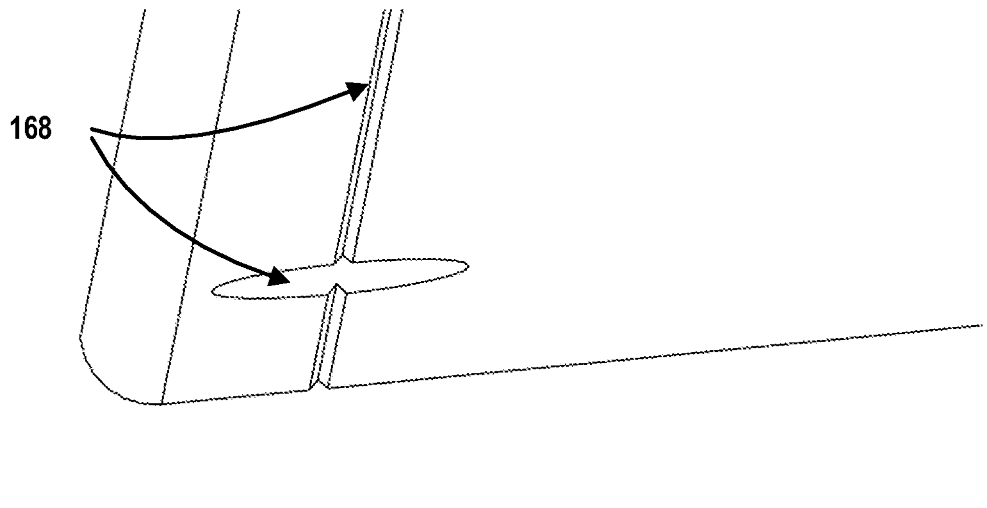
*FIG.* 12B

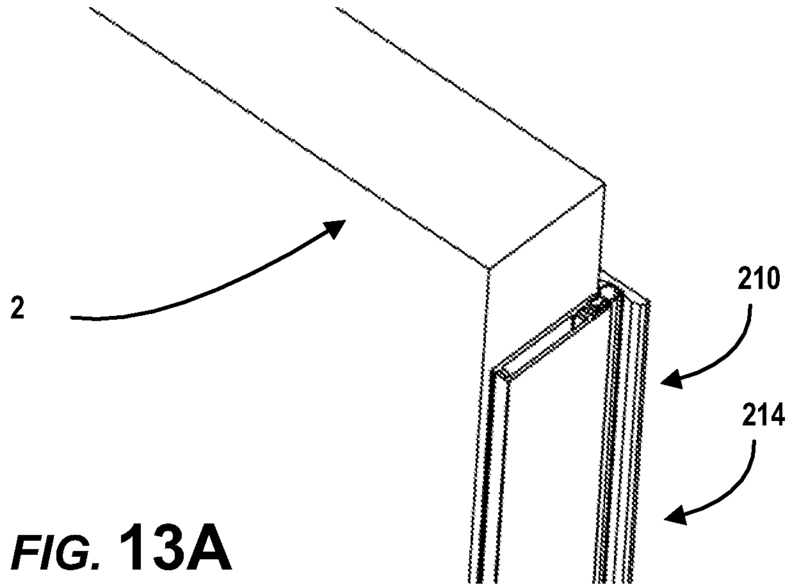
*FIG.* 13A
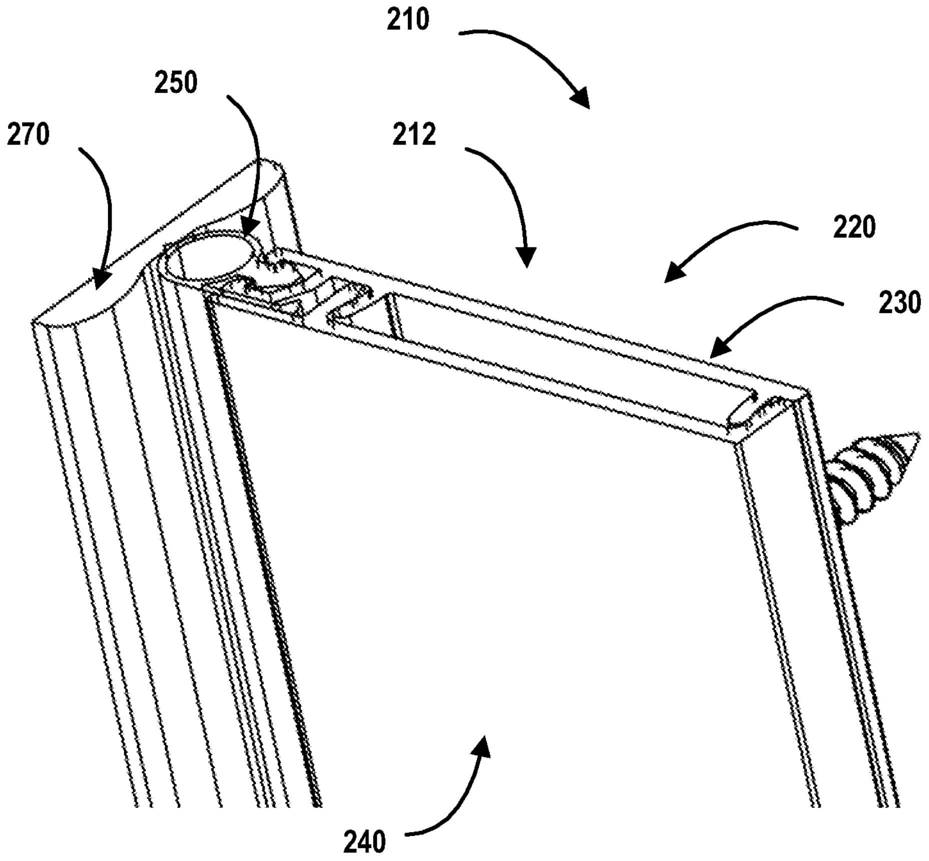
*FIG.* 13B

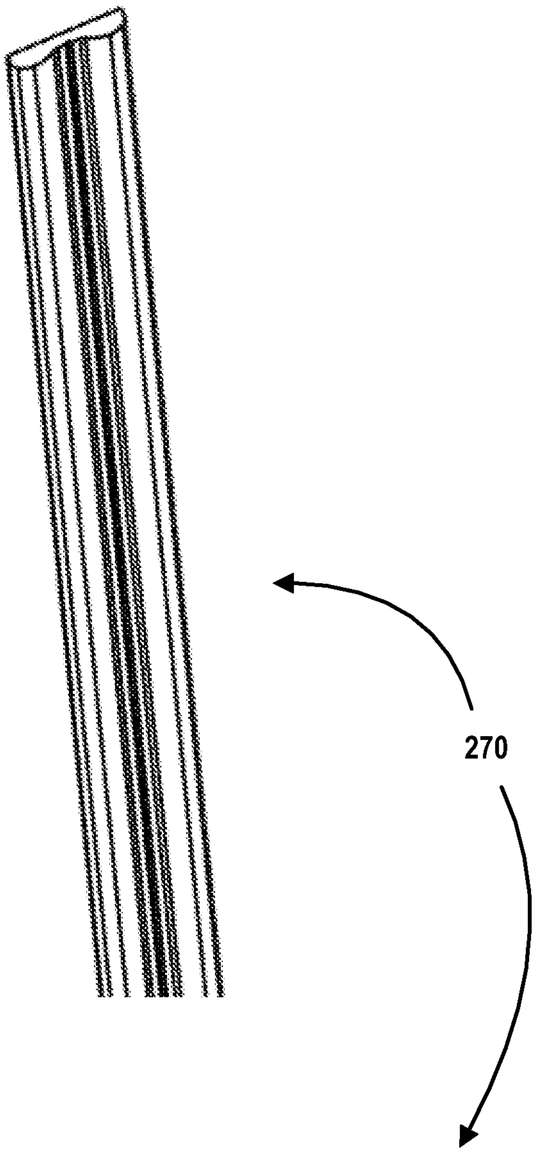
*FIG.* 17A
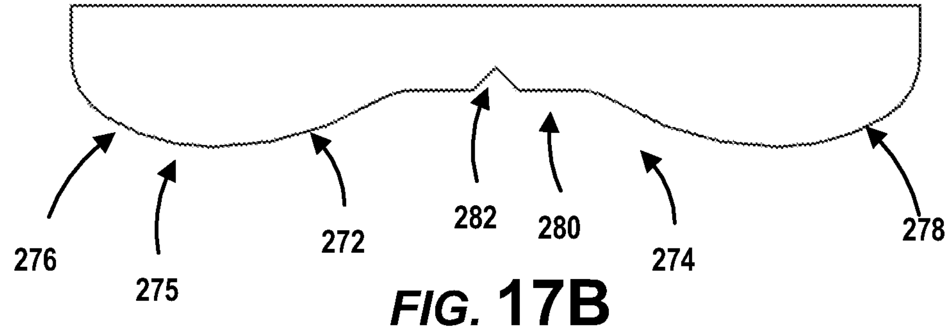
*FIG.* 17B

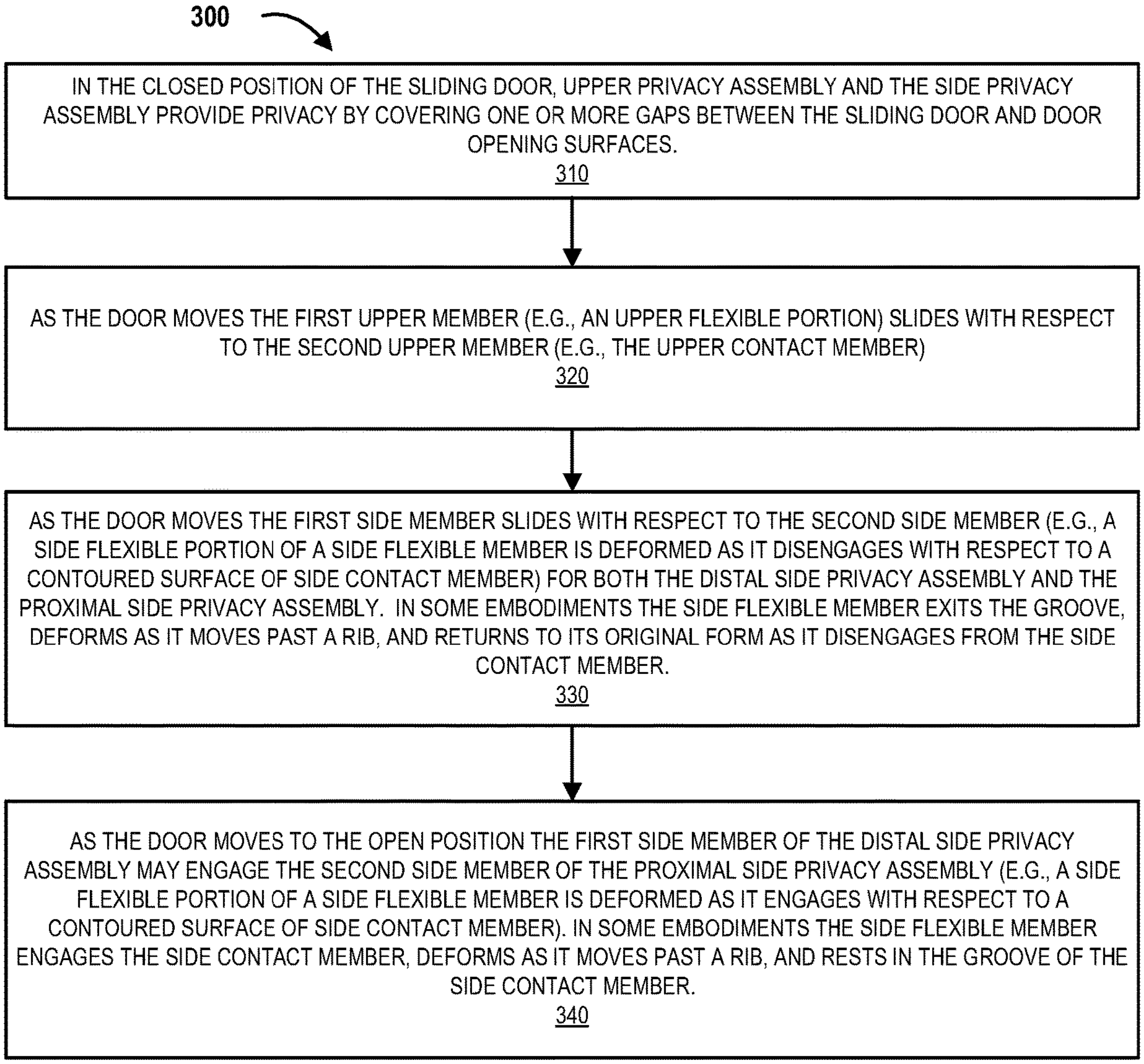
*FIG.* 18

PRIVACY SYSTEM FOR SLIDING DOORS

CROSS REFERENCE AND PRIORITY CLAIM UNDER 35 U.S.C. § 119

This application claims priority to U.S. Provisional Application No. 63/151,428 entitled "Privacy System for Sliding Doors" filed on Feb. 19, 2021 which is assigned to the assignee hereof and the entirety of which is incorporated by reference herein.

FIELD

This application relates generally to the field of sliding doors, and more particularly, to a privacy system for blocking one or more gaps between a sliding door and a wall or door frame.

BACKGROUND

Doors, in particular sliding doors, may be required to provide the desired configurations for allowing people and equipment to pass, but also to provide sound proofing, gas sealing (e.g., air, or the like), debris or particulate sealing, and/or light sealing for industrial, commercial, healthcare, residential, or other facilities. In order to meet the needs of customers, sliding doors may be of a variety of sizes, utilize soft close actuators, and include elements/seals for sound, gas, debris, and/or light sealing.

BRIEF SUMMARY

The present disclosure relates to apparatuses, systems, and/or methods for improving the privacy for sliding doors by covering one or more gaps between a sliding door and/or one or more door opening surfaces (e.g., side walls, upper wall, side frames, upper frame, or the like located around or within a door opening). A sliding door system may comprise one or more sliding doors and sliding door hardware (e.g., a track system, including tracks, wheels, supports, stops, seals, and/or the like, handles, a soft close apparatus, and/or the like) operatively coupled to the one or more doors and/or the one or more door opening surfaces. The sliding door system may include a privacy system for covering one or more gaps created from mounting the sliding door to the one or more door opening systems. The privacy system may comprise one or more privacy assemblies for example, an upper privacy assembly and one or more side privacy assemblies, such as a distal privacy assembly and a proximal privacy assembly, which may be the same or different.

The upper privacy assembly may comprise a first upper member operatively coupled to the door, and a second upper member operatively coupled to one or more door opening surfaces. As such, when the sliding door moves with respect to the door opening surface, the first upper member will slide with respect to the second upper member. When the sliding door is in the closed position, the engagement between the first upper member and the second upper member aids in restricting light from passing through an upper gap between the door and the door opening surface. It should be understood that the first upper member and/or the second upper member may have an upper flexible portion (e.g., may have a section that is flexible or may be entirely flexible). However, in the embodiments illustrated in the figures the first upper member has the upper flexible portion and is operatively coupled to the door. The upper flexible upper portion may comprise a gasket (e.g., seal, liner, or the like) made of any type of material that allows for flexing of the material. The upper flexible portion may have any type of shape, such as linear, curved (e.g., half circle, circle, parabolic, or the like), or the like.

The one or more side privacy assemblies may comprise a distal privacy assembly (e.g., adjacent the right or left sides of the door) and a proximal privacy assembly (e.g., adjacent the opposite side of the door). The one or more side privacy assemblies may comprise a first side member and a second side member, each operatively coupled to the door and/or the door opening surface, respectively. The first side member and/or the second side member may comprise a side flexible portion. However, in the embodiments illustrated in the figures, the first side member is operatively coupled to the door and has the side flexible portion, while the second side member is operatively coupled to the door opening surface (e.g., wall 10, door frame 12, or the like) and has a side contact surface for engaging with the first side member (e.g., the side flexible portion).

Embodiments of the invention comprise a privacy system for a sliding door. The system comprises one or more privacy assemblies operatively coupled to the sliding door and a door opening surface. The one or more privacy assemblies at least partially cover one or more gaps between the sliding door and the door opening surface.

In further embodiments, the one or more privacy assemblies comprise an upper privacy assembly. The upper privacy assembly comprises a first upper member operatively coupled to the sliding door, and a second upper member operatively coupled to the door opening surface. The first upper member and the second upper member engage and slide with respect to each other during opening and closing of the sliding door.

In other embodiments, the first upper member or the second upper member comprise an upper flexible member. In still other embodiments, the other of the first upper member or the second upper member is an upper contact member having one or more contact surfaces. The upper flexible portion slides with respect to the upper contact member as the sliding door moves with respect to the door opening surface.

In yet other embodiments, the upper contact member comprises a top surface and a face surface. The upper flexible member engages the top surface or the face surface. In other embodiments, the upper flexible member comprises an upper flexible portion comprising a curved gasket.

In further embodiments, the one or more privacy assemblies comprise one or more side privacy assemblies. The one or more side privacy assemblies comprise a first side member operatively coupled to the sliding door, and a second side member operatively coupled to the door opening surface. The first side member and the second side member engage and disengage during the opening and closing of the sliding door.

In other embodiments, the first side member or the second side member comprise a side flexible member. In still other embodiments, the other of the first side member or the second side member comprises a side contact member having one or more contact surfaces. The side flexible member engages the one or more contact surfaces of the side contact member.

In yet other embodiments, the one or more contact surfaces of the side contact member comprise a contoured surface. The contoured surface restricts movement of the side flexible member. In other embodiments, the contoured surface comprises a groove.

In further embodiments, the side flexible member comprises a side flexible portion comprising a gasket having a curved surface and one or more legs. In other embodiments, the side flexible member comprises a mounting member operatively coupled to the sliding door, a cover member operatively coupled to the mounting member, and a side flexible portion operatively coupled to the mounting member or the cover member.

In still other embodiments, the side flexible portion comprises a flexible surface, and one or more legs operatively coupled the flexible surface. The one or more legs are operatively coupled to the mounting member or the cover member.

In yet other embodiments, the one or more legs comprises a base leg for operatively coupling with the mounting member or the cover member. In other embodiments, the mounting member or the cover member comprise a channel. The channel is operatively coupled to the base leg of the side flexible portion.

In further embodiments, the one or more legs comprise a support leg for operatively coupling between the mounting member and the cover member.

Embodiments of the invention comprise, a method for providing privacy to a sliding door system. The method comprises providing a privacy system comprising one or more privacy assemblies for a sliding door. When the sliding door is in a closed position, the one or more privacy assemblies span one or more gaps to restrict light from passing through the one or more gaps. The one or more privacy assemblies at least partially disengage exposing the one or more gaps as the sliding door moves from the closed position to one or more open positions.

In further embodiments, the one or more privacy assemblies comprise an upper privacy assembly. The upper privacy assembly comprises a first upper member operatively coupled to the sliding door and a second upper member operatively coupled to the door opening surface, and the first upper member and the second upper member engage. As the sliding door moves from the closed position to the one or more open positions the first upper member slides with respect to the second upper member exposing at least a portion of an upper gap of the one or more gaps.

In other embodiments, the one or more privacy assemblies comprise one or more side privacy assemblies. At least one of the one or more side privacy assemblies comprises a first side member operatively coupled to the sliding door, and a second side member operatively coupled to the door opening surface. As the sliding door moves from the closed position to the one or more open positions the first side member disengages from the second side member exposing at least a portion of one or more side gaps of the one or more gaps.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF DRAWINGS

The accompanying drawings, which illustrate embodiments of the invention and which are not necessarily drawn to scale, are as follows:

FIG. 3 illustrates a perspective view of a sliding door system with the door removed illustrating a privacy system for the sliding door system, in accordance with embodiments of the present disclosure.

FIG. 8 illustrates a side view of the upper privacy assembly of the privacy system on the distal side of the sliding door, in accordance with embodiments of the present disclosure.

FIG. 10 illustrates a perspective enlarged view of the second upper member of the upper privacy assembly, in accordance with embodiments of the present disclosure.

FIG. 11A illustrates a top perspective view of the second upper member of the upper privacy assembly, in accordance with embodiments of the present disclosure.

FIG. 11B illustrates a side view of the second upper member of the upper privacy assembly, in accordance with embodiments of the present disclosure.

FIG. 12A illustrates a bottom perspective view of the second upper member of the upper privacy assembly, in accordance with embodiments of the present disclosure.

FIG. 12B illustrates an enlarged bottom perspective view of the second upper member of the upper privacy assembly, in accordance with embodiments of the present disclosure.

FIG. 13A illustrates a perspective view of a portion of a side privacy assembly installed on a door and door opening surface, in accordance with embodiments of the present disclosure.

FIG. 13B illustrates an enlarged perspective view of a portion of a side privacy assembly, in accordance with embodiments of the present disclosure.

FIG. 17A illustrates a perspective view of a portion of the second side member of a privacy assembly, in accordance with embodiments of the present disclosure.

FIG. 17B illustrates a top view of the second side member of a privacy assembly, in accordance with embodiments of the present disclosure.

FIG. 18 illustrates a process flow for the operation of the one or more privacy assemblies, in accordance with embodiments of the present disclosure.

DETAILED DESCRIPTION

Embodiments of the present disclosure now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Figure 1:
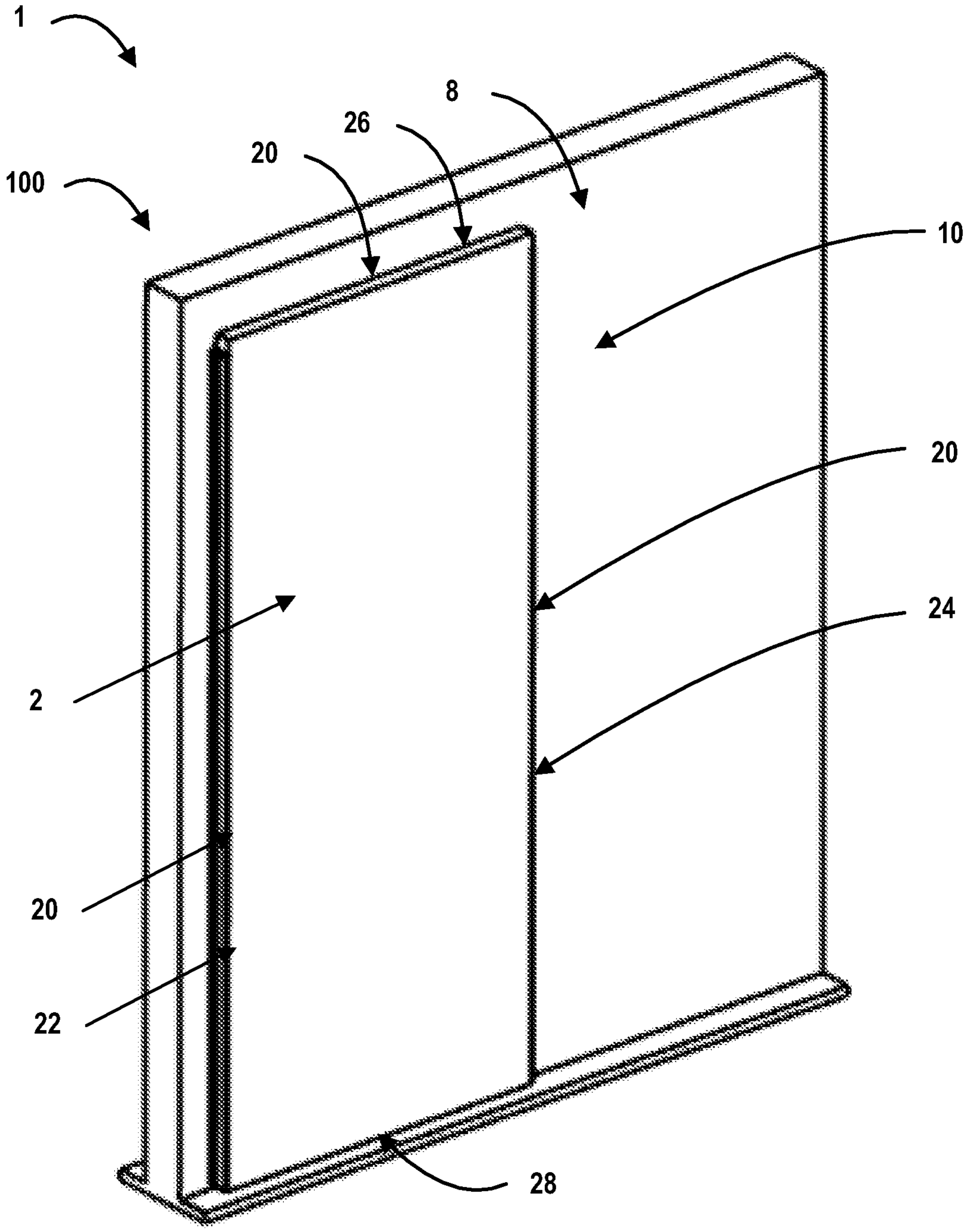
FIG. 1 illustrates a perspective view of a sliding door system, in accordance with embodiments of the present disclosure.
Figure 2B:
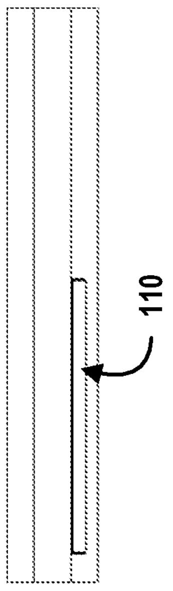
FIG. 2*b* illustrates a top view of a sliding door system, in accordance with embodiments of the present disclosure.
Figure 2D:
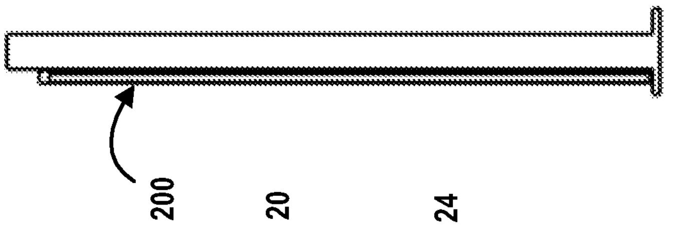
FIG. 2*d* illustrates a proximal side view of a sliding door system, in accordance with embodiments of the present disclosure.
Figure 2A:
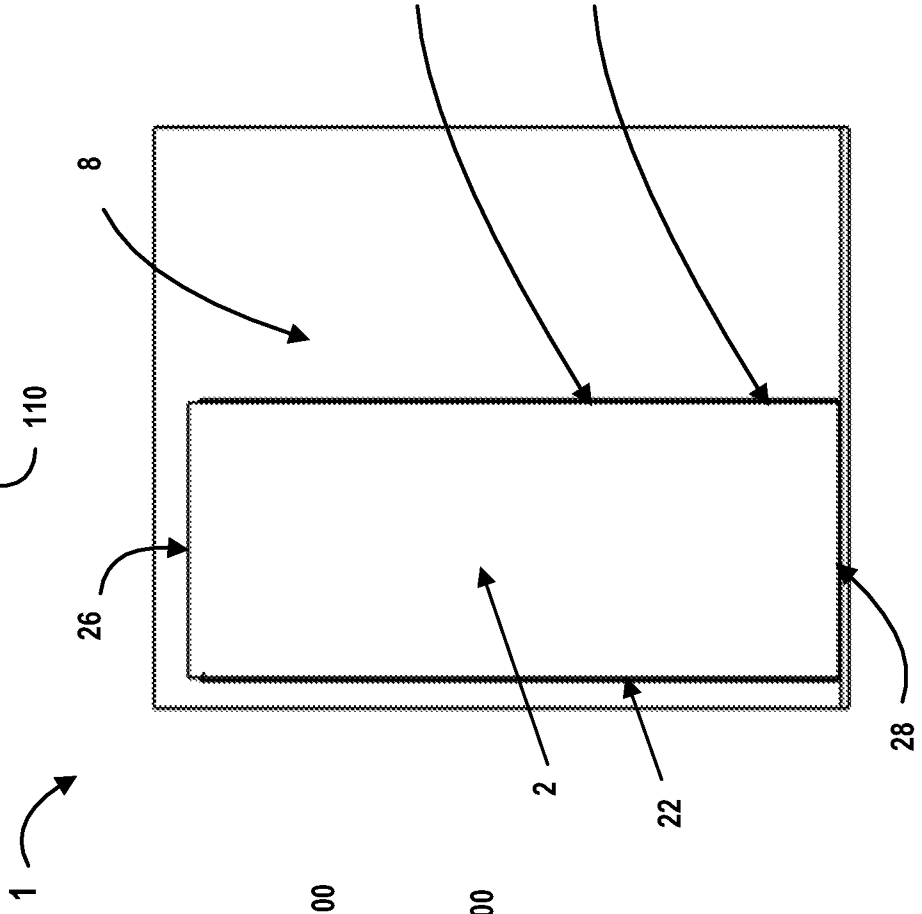
FIG. 2*a* illustrates a front view of a sliding door system, in accordance with embodiments of the present disclosure.
Figure 2C:
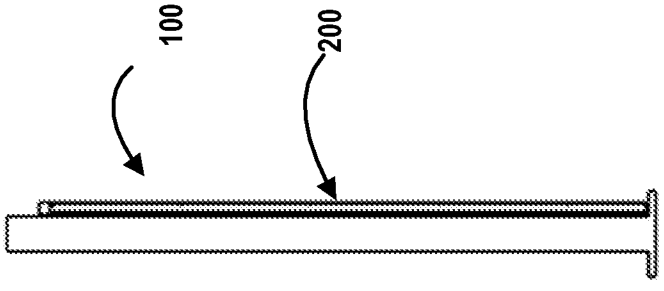
FIG. 2*c* illustrates a distal side view of a sliding door system, in accordance with embodiments of the present disclosure.
Figure 4:
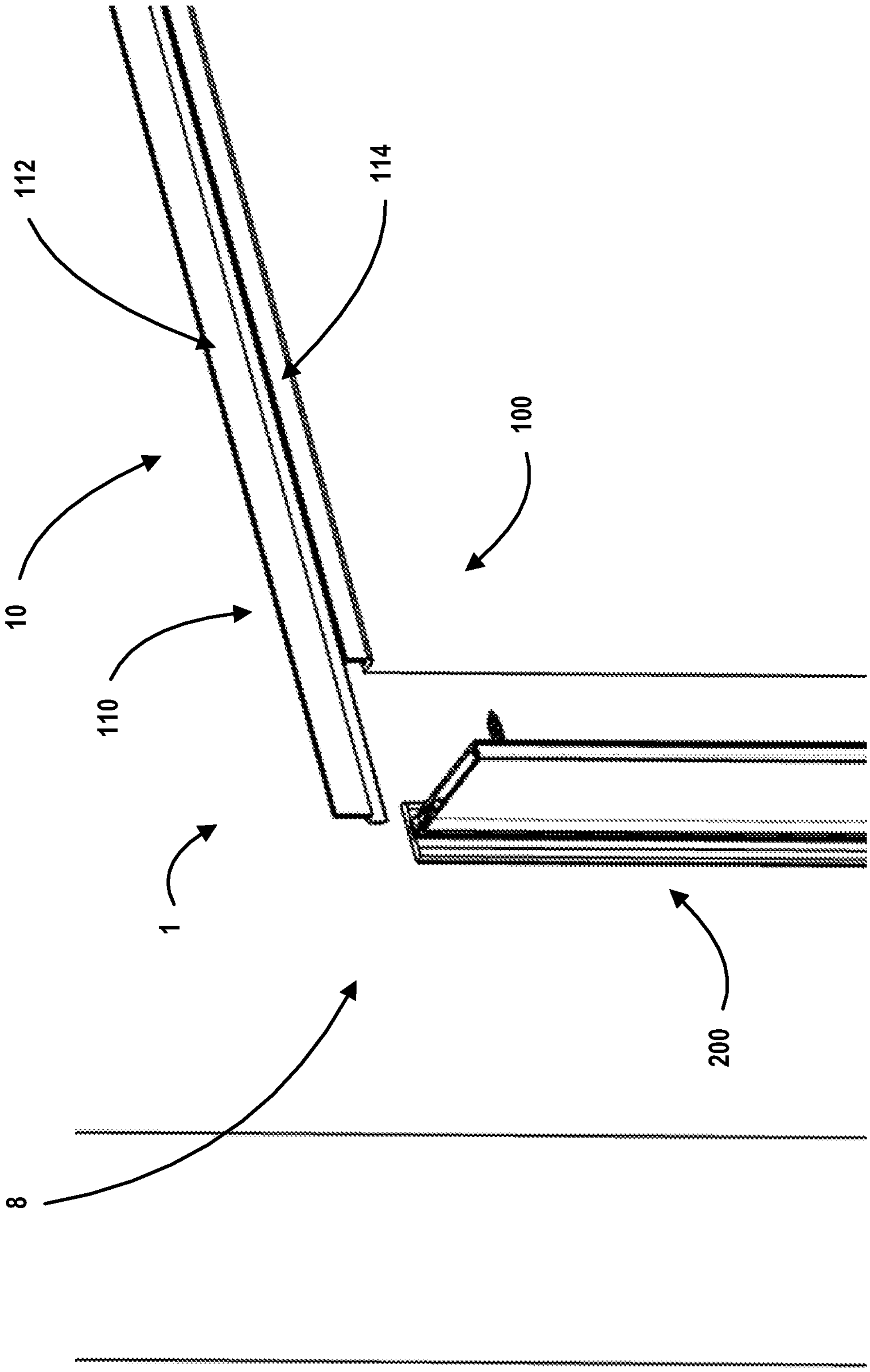
FIG. 4 illustrates an enlarged view of a portion of the privacy system on the distal side of the sliding door with the door removed, in accordance with embodiments of the present disclosure.
Figure 5:
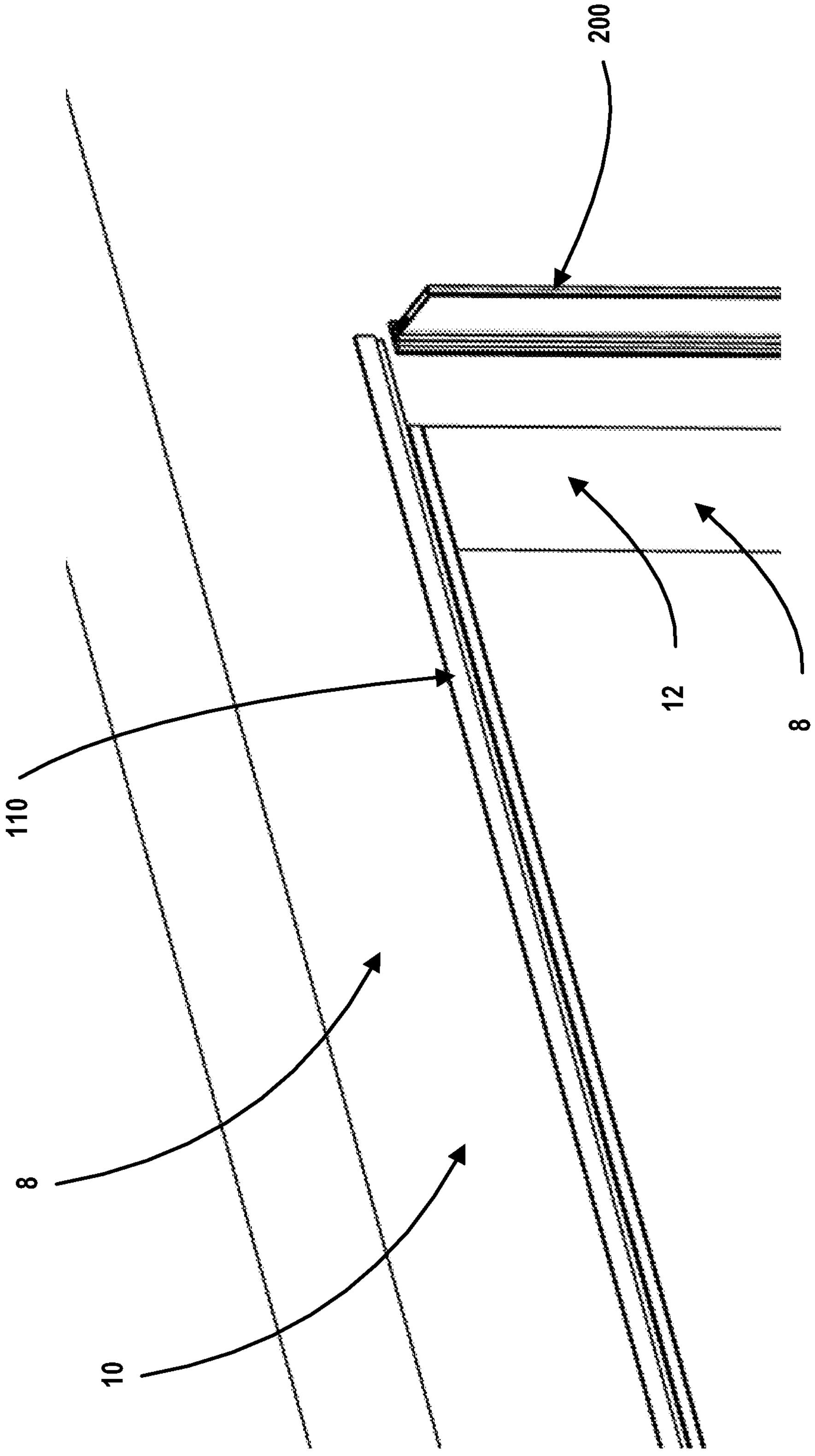
FIG. 5 illustrates an enlarged view of a portion of the privacy system on the proximal side of the sliding door with the door removed, in accordance with embodiments of the present disclosure.
Figure 6:
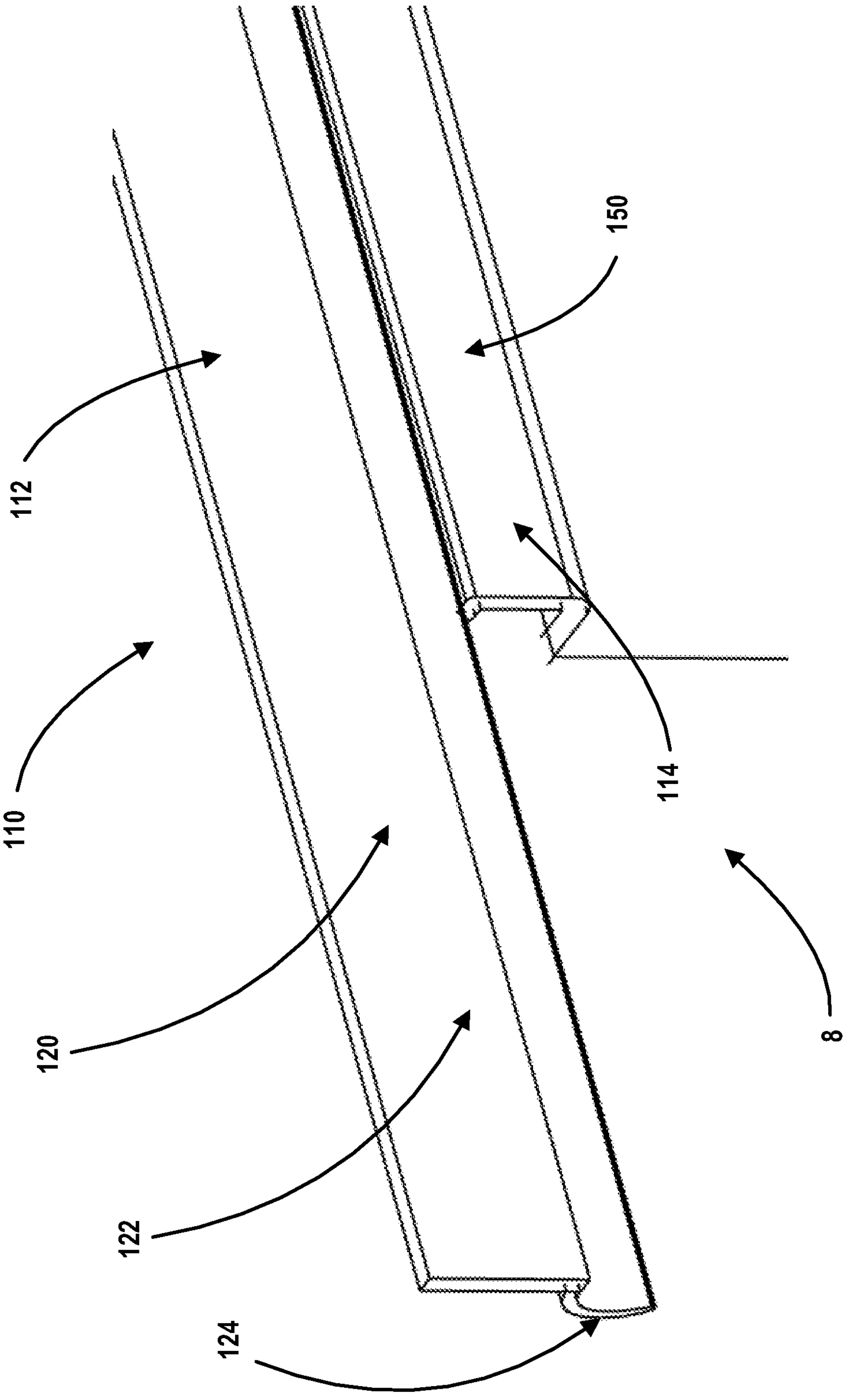
FIG. 6 illustrates an enlarged view of a portion of an upper privacy assembly of the privacy system on the distal side of the sliding door with the door removed, in accordance with embodiments of the present disclosure.

The present disclosure relates to apparatuses, systems, and/or methods for providing privacy for sliding doors 2 by covering one or more gaps between a sliding door 2 and/or one or more door opening surfaces 8 (e.g., a wall 10, frame members 12 that surround and/or are located within the opening of door 2). In particular, the present disclosure relates to utilizing a privacy system 100 with a sliding door system 1. As illustrated in FIG. 1, it should be understood that the sliding door system 1 may comprise one or more sliding doors 2 and sliding door hardware 4 (e.g., a track system, including tracks, wheels, supports, stops, seals, and/or the like, a soft close apparatus, including one or more actuators—not illustrated, and/or the like) operatively coupled to the door 2 and one or more door opening surfaces 8 (e.g., a wall 10, frame members 12 that surround and/or are located within the opening of door). It should be understood that the sliding door 2 may be any type of sliding door 2, such as but not limited to sound rated sliding doors, bypass doors, pocket sliding doors, patio sliding doors, barn sliding doors, bi-part sliding doors, or any other type of sliding door. As such, it should be understood that when discussing "a sliding door" herein, this may refer to any type of sliding door, and/or one or more sliding doors (e.g., such as bi-part sliding doors, or the like). Regardless of the type of door 2, the door 2 may have edges 20, such as opposing edges 22, 24, a top edge 26, a bottom edge 28, and opposing faces 30, such as a first face 32 (e.g., a front face) and a second face 34 (e.g., a back face). In some embodiments the one or more sliding doors 2 may be hollow, solid, sound rated, projectile resistant (e.g., weather resistant, ballistic resistant, or the like), or the like, and as such, the sliding doors may include a specialized core.

FIGS. 1 through 17B illustrate various components of the privacy system 100 for the sliding door 2. The privacy system 100 may comprise one or more privacy assemblies 102 for example, an upper privacy assembly 110 and one or more side privacy assemblies 210, such as a distal privacy assembly 202 and a proximal privacy assembly 204. In a sliding door system 1, the door 2 is offset from the door opening surface 8, which allows for the door to slide with respect to the door opening surface(s) 8 to allow or prevent movement through the door opening (e.g., to allow or prevent egress and/or ingress). The offset of the sliding door 2 from the door opening surface 8 creates one or more gaps between the door 2 and the door opening surface 8 through which light may pass (e.g., escape or enter). As such, the one or more gaps may allow people to look through the gap (e.g., out of an enclosure or into an enclosure). As will be described herein, the privacy system 100 is utilized to cover at least a portion of the one or more gaps created between a sliding door 2 and a door opening surface 8 (e.g., a wall 10, frame members 12, or the like). It should be understood, as will be described herein, that the size of the one or more gaps may change (e.g., the distance between the door opening surface 8 and the door 2 may be different for different sliding door systems 1).

As illustrated in FIGS. 3 to 12B, the upper privacy assembly 110 comprises a first upper member 112 operatively coupled to the door 2, and a second upper member 114 operatively coupled to a door opening surface 8. As such, when the sliding door 2 moves with respect to the door opening surface 8, the first upper member 112 will slide with respect to the second upper member 114. In the closed position, the engagement between the first upper member 112 and the second upper member 114 aids in restricting light from passing through an upper gap between the door 2 (e.g., top edge 26) and an upper wall or upper frame of a door opening. It should be understood that the first upper member 112 and/or the second upper member 114 may have an upper flexible portion (e.g., may have a section that is flexible or may be entirely flexible). As illustrated in FIGS. 4 through 9B, the first upper member 112 may comprise an upper flexible member 120 that comprises an upper attachment portion 122 and/or an upper flexible portion 124 operatively coupled to the upper attachment portion 122. The upper flexible portion 124 may comprise a gasket (e.g., seal, liner, or the like) made of any type of rubber, plastic, composite, sheet, or other like material that allows for flexing of the material. The flexible upper portion 124 may have any type of shape, such as linear, curved 126 (e.g., half circle, circle, parabolic, or the like), or the like. While the upper flexible member 120 is illustrated as being operatively coupled to the door 2, it should be understood that the upper flexible member 120 may be a second upper member 114 that is operatively coupled to a door opening surface 8. Moreover, while the first upper member 112 is illustrated as being longer than the second upper member 114, it should be understood that the second upper member 114 may extend, or have an extension portion, that allows the second upper member 114 to extend outside of the door opening (not illustrated). In this way, the upper privacy assembly 110 can cover more of the upper gap than what is currently illustrated in the figures. In some embodiments, the upper flexible member 120 may be used without the upper contact member 150, and as such may slide with respect to a surface of the door 2 (e.g., when installed on a door opening surface 8), or slide with respect to a door opening surface 8 (e.g., when installed on a surface of the door 2).

As illustrated in FIGS. 10 through 12B the second upper member 114 may comprise an upper contact member 150 against which the upper flexible member 120 may slide as the sliding door 2 moves with respect to the door opening surface 8. The upper contact member 150 may be formed of any type of shape having one or more contact surfaces 152. As illustrated in FIGS. 10 through 12B, the upper contact member 150 may comprise a generally L-shaped member 160 (e.g., angle, or the like) having a first portion 162 operatively coupled to a second portion 164, and a third portion 166 operatively coupled to the second portion 164. The first portion 162 may be configured for operative coupling with a door opening surfaces 8 (e.g., to an upper surface inside of a frame 12 or wall 10 of a door opening, as illustrated). As such, in some embodiments a connection (e.g., clip, slide, track, fastener—screw, bolt, nut, or the like, weld, or other like connection) may be utilized in order to operatively couple the upper contact member 150 to the door opening surface 8. In other embodiments, the upper contact member 150 may be operatively coupled to a frame of the door opening in an integral manner. As illustrated in FIGS. 12A and 12B, the second upper member 114 may comprise one or more connection apertures 168 (e.g., bore, through-hole, groove, die marks, or the like) that may partially extend into a surface of the second member, or extend through the second member. The connection apertures 168 may provide a guide for operatively coupling the second upper member 114 with a door opening surface 8 (e.g., providing a guide for a drill bit, a screw being screwed through the second upper member 114, or the like). As further illustrated in FIGS. 7 and 8, the upper contact member 150 may comprise a top contact surface 154 and/or face contact surface 156. Consequently, the first upper member 112 (e.g., a flexible portion 124) may engage (e.g., contact, or the like) the second upper member 114 (e.g., upper contact member 150), such as the top contact surface 154 and/or a face contact surface 156 (or another contact surface 152). While the upper contact member 150 is illustrated as being L-shaped, in other embodiments, the upper contact member 150 may be of any shape, such as but not limited to a semi-circle, circular, triangular, square, rectangular, parabolic, linear, or the like.

Figure 14:
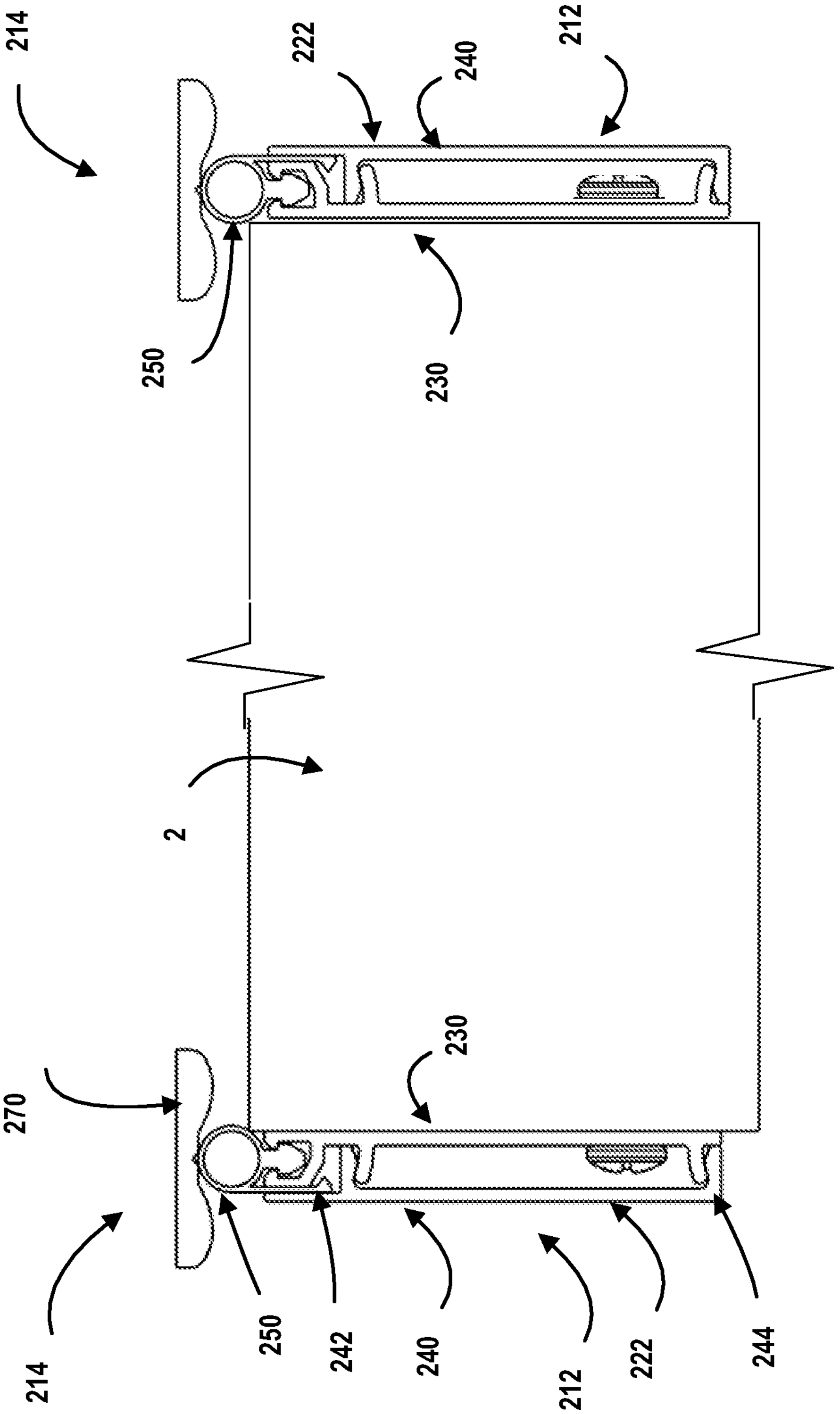
FIG. 14 illustrates a top view of two side privacy assemblies operatively coupled to a door, in accordance with embodiments of the present disclosure.
Figure 15A:
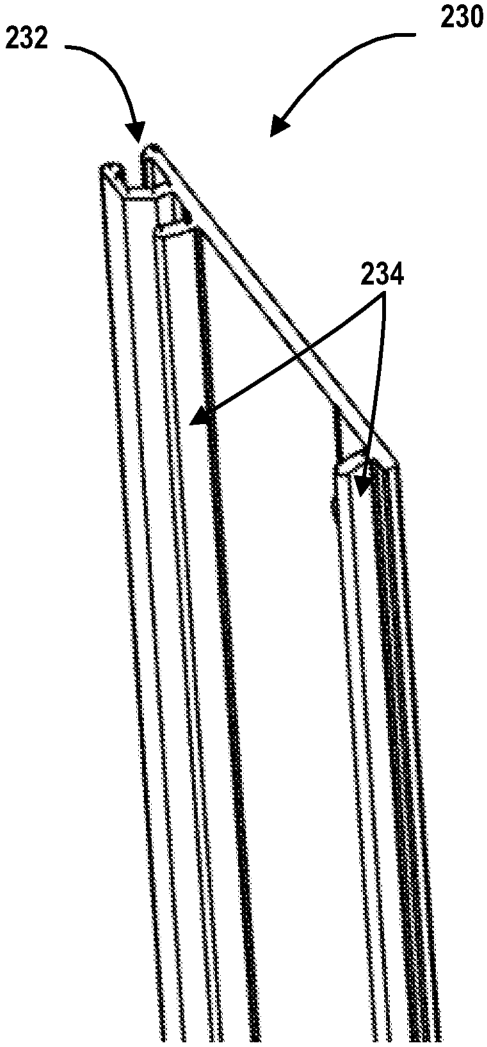
FIG. 15A illustrates a perspective view of a mounting member of a side privacy assembly, in accordance with embodiments of the present disclosure.
Figure 15B:
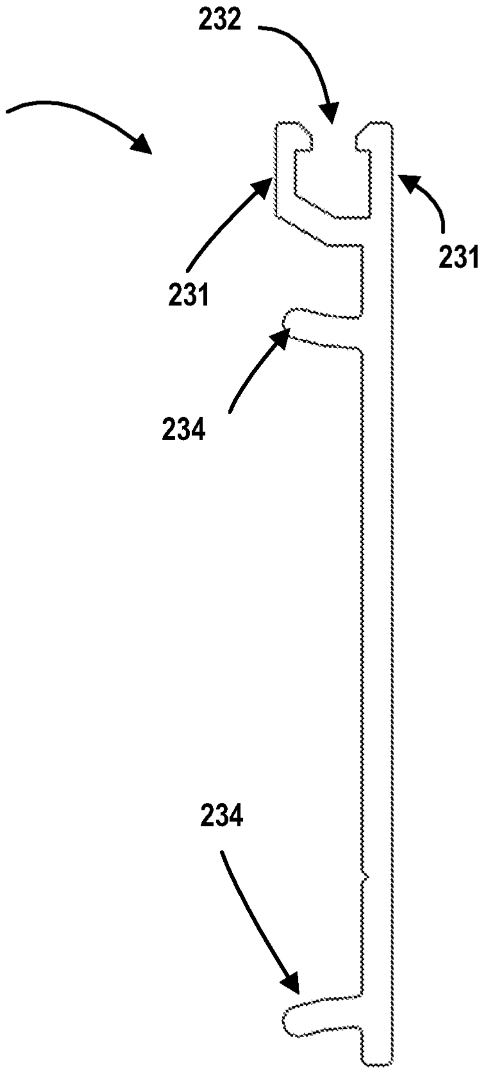
FIG. 15B illustrates a top view of a mounting member of a side privacy assembly, in accordance with embodiments of the present disclosure.

As illustrated in FIGS. 13A through 17B, the one or more side privacy assemblies 200 may comprise a distal privacy assembly 202 (e.g., adjacent the right or left sides of the door 2) and a proximal privacy assembly 204 (e.g., adjacent the opposite side of the door 2). The side privacy assemblies 200 may be different or may be the same, as illustrated in FIG. 14. The one or more side privacy assemblies 200 may comprise a first side member 212 and a second side member 214. It should be understood that the first side member 212 and the second side member 214 may be operatively coupled to the door 2 and/or the door opening surface 8. As such, the first side member 212 or the second side member 214 may comprise a side flexible portion. However, in the embodiment illustrated in FIG. 14, the first side member 212 is operatively coupled to the door 2 and has the side flexible portion 250, while the second side member 214 is operatively coupled to the door opening surface 8 (e.g., wall 10, door frame 12, or the like) and has one or more contact surfaces 272 for engaging with the first side member 214 (e.g., the side flexible portion 250).

As illustrated in FIGS. 13A through 17B, the first side member 212 may be a side flexible member 220 comprising a side attachment portion 222 and a side flexible portion 250. The side attachment portion 222 may comprise a mounting member 230 configured for operative coupling with the door 2 and a cover member 240 configured for operative coupling with the mounting member 230. It should be understood that the side attachment portion 222 may have one or more arms 231 that form a channel 232 for operative coupling with the side flexible portion 250. In the illustrated embodiment, the mounting member 230 may comprise the channel 232; however, in other embodiments the channel 232 may be located in the cover member 240. As will be described in further detail herein, the channel 232 may be utilized to operatively coupled the side flexible portion 250 with the attachment portion 222. The mounting member 230 may comprise one or more projections (e.g., mounting projections 234), and the cover member 240 may comprise one or more projections (e.g., cover projections 244) that allow for operative coupling with the mounting member 240. For example, the mounting member 230 and the cover member 240 may be clipped together through the use of the one or more mounting projections 234 and the one or more cover projections 244. In some embodiments, the one or more mounting projections 234 may be compressed by the one or more cover projections 244, as illustrated in FIGS. 13A through 17B (or vice versa). Moreover, as will be described in further detail herein, the mounting member 230 and the cover member 240 may form a cavity 242 that may be utilized to aid in operatively coupling the side flexible portion 250 with the side attachment portion 222.

Figure 16:
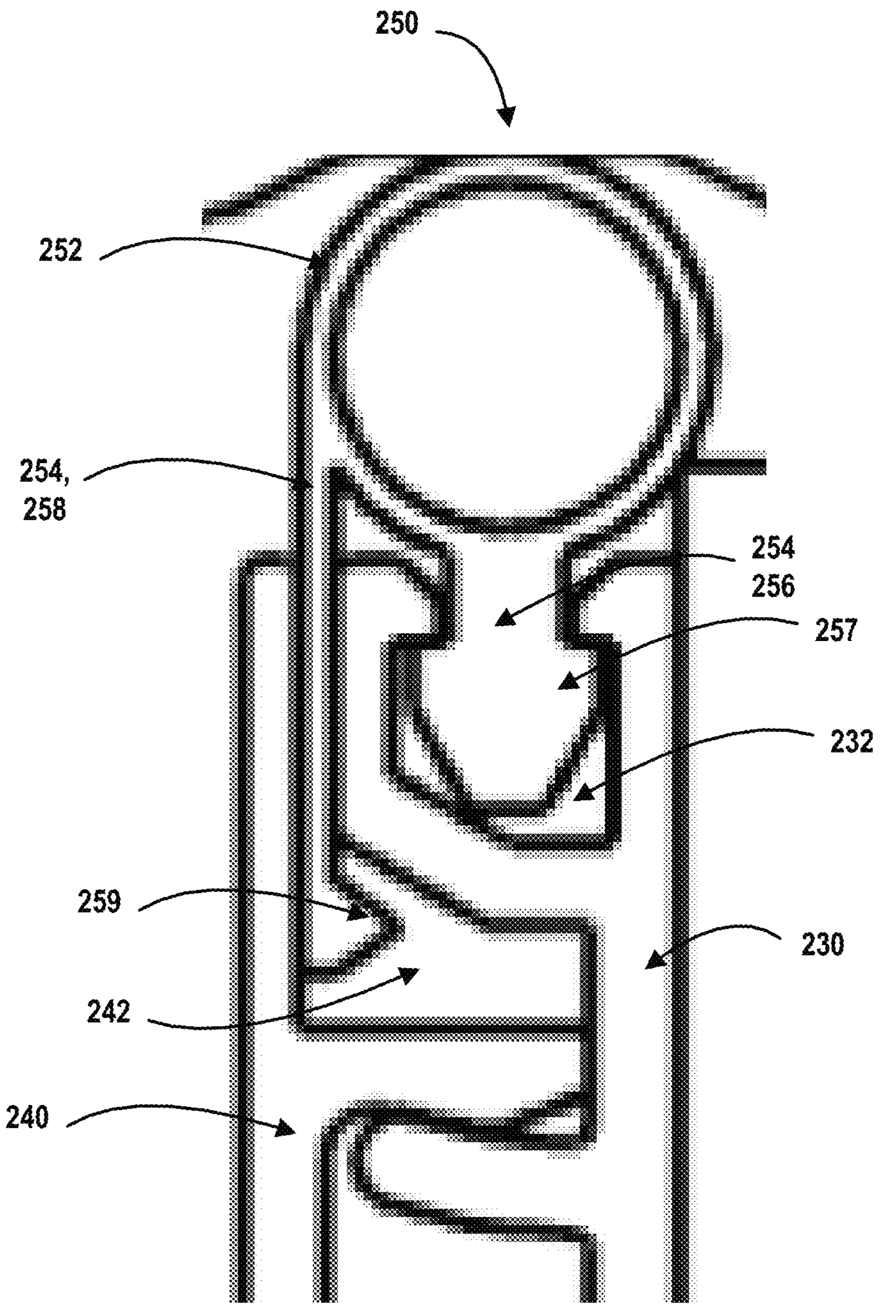
FIG. 16 illustrates a cross-sectional view of a portion of the first side member of a privacy assembly, in accordance with embodiments of the present disclosure.

As illustrated in FIG. 16, the side flexible portion 250 may comprise a gasket (e.g., seal, liner, or the like) made of any type of rubber, plastic, composite, sheet, or other like material that allows for flexing of the material. The side flexible portion 250 may have any type of shape, such as linear, curved (e.g., half circle, circle, parabolic, or the like), or the like. In the illustrated embodiment, the side flexible portion 250 has a circular shape (e.g., an o-shaped gasket 252) and one or more legs 254, such as a base leg 256 and a support leg 258. The base leg 256 may further have one or more base leg projections 257, and the support leg 258 may have one or more support leg projections 259. The base leg 256 may be operatively coupled to the channel 232 of the side attachment portion 222 (e.g., in the mounting member 230 or the cover member 240), such as slid into, clipped into, or the like. Moreover, the support leg 258 may be operatively coupled to the side attachment portion 222 (e.g., the mounting member 230 and/or the cover member 240). In some embodiments, the support leg 258 may be compressed between a portion of the mounting member 230 and a portion of the cover member 240. Moreover, the support leg projection 259 may located in the cavity 242. It should be understood that the support leg 258 of the side flexible portion 250 may be utilized to aid in restricting slippage of the side flexible portion 250 with respect to the attachment portion 222 (e.g., slipping within the channel 232). Moreover, the support leg 258 may aid in restricting the side flexible portion 250 from being pulled out of the rigid member 222 (e.g., out of the channel 232) during the repeated use of the sliding door 2. Additionally, the support leg 258 may aid in positioning the side flexible portion 250 in the desired position after the side flexible portion 250 has been deformed during its use (e.g., aid in returning the o-shaped gasket 252 to its original form and/or position).

FIGS. 17A and 17B illustrate that the second side member 214 may comprise a side contact member 270 (e.g., ramp member, or other like member) against which the side flexible member 220 may engage and disengage as the sliding door 2 opens and closes. The side contact member 270 may be formed of any type of shape having one or more contact surfaces 272. As illustrated in FIGS. 17A and 17B the side contact member 270 may comprise a contoured surface 274, wherein the contoured surface 274 restricts movement of the side flexible portion 220. The contoured surface 274 may be angled, curved, or the like in order to aid in keeping the side flexible member 220 in place while the door 2 is static, but compresses the side flexible member 220 when the door 2 moves in order to allow the side flexible member 220 to disengage with the contact member 270. In the illustrated embodiments, the contoured surface 274 comprises one or more ribs 275, such as a first rib 276 and a second rib 278, which form a groove 280 in which with side flexible member 220 may be located when the door 2 is in the closed position (or the open position as will be described in further detail herein). Consequently, the first side member 212 may be located within the groove 280 of the second side member 214 when the sliding door 2 is in the closed position. It should be understood that in some embodiments, when the sliding door 2 is in the fully opened position the first side member 212 of distal privacy assembly 202 may engage with the second side member 214 of the proximal privacy assembly 204. As such, the door 2 may be held in the open position. Moreover, the contoured surface 274 may further include a one or more connection apertures 282 (e.g., bore, through-hole, groove, die marks, or the like), which as described with the second upper member 114, may partially extend into a surface of the second side member 214, or extend through the second side member 214. The connection aperture 282 may provide a guide for operatively coupling the second side member 214 with a door opening surface 8 (e.g., providing a guide for a drill bit, a screw being screwed through the second side member 214, or the like).

In some embodiments, the side flexible member 220 may be used without the side contact member 270, and as such may slide with respect to a surface of the door 2 (e.g., when installed on a door opening surface 8), or slide with respect to a door opening surface 8 (e.g., when installed on a surface of the door 2).

Figure 7:
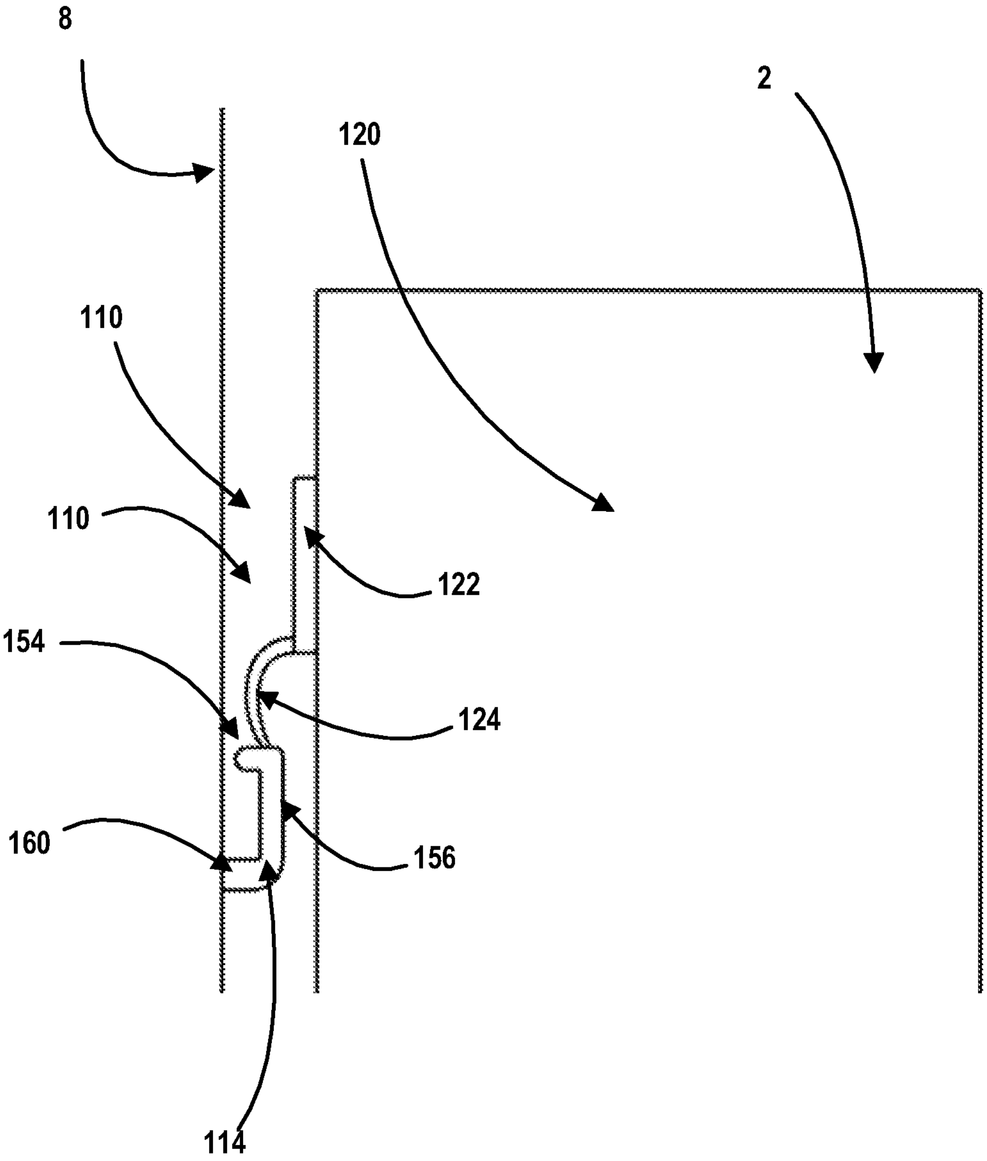
FIG. 7 illustrates a side view of the upper privacy assembly of the privacy system on the distal side of the sliding door, in accordance with embodiments of the present disclosure.
Figure 9A:
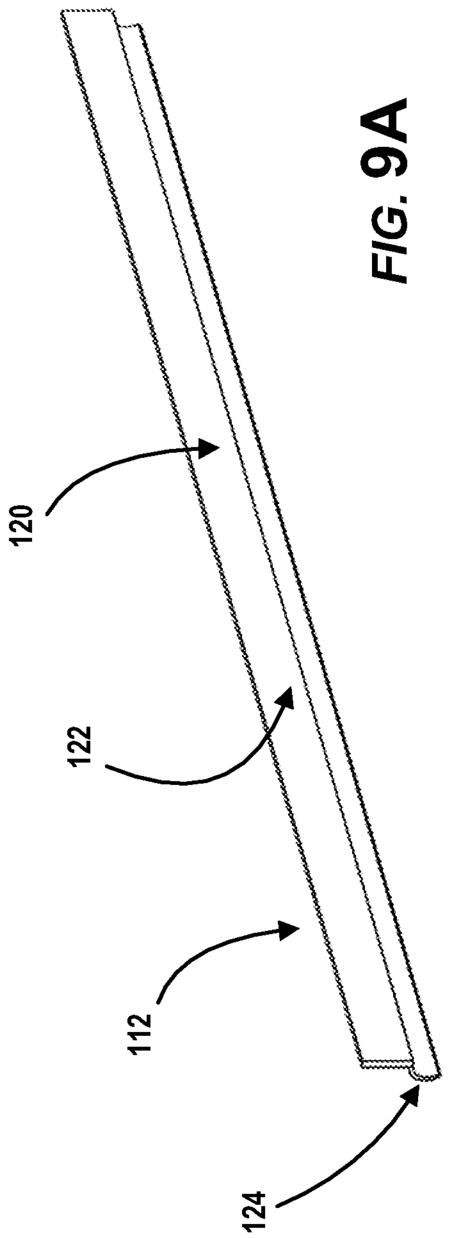
FIG. 9A illustrates a perspective view of the first upper member of the upper privacy assembly, in accordance with embodiments of the present disclosure.
Figure 9B:
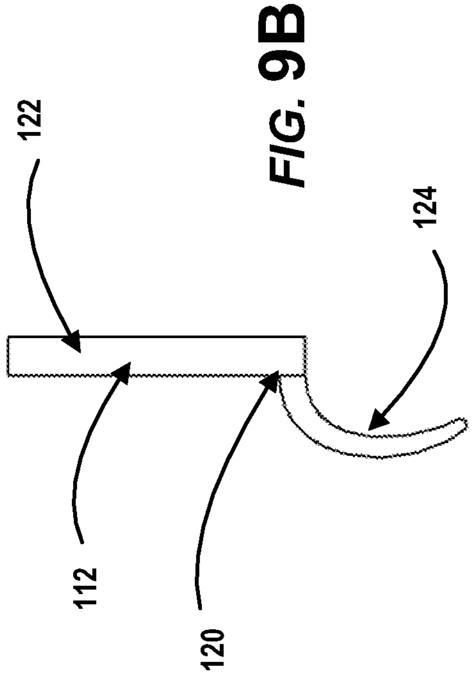
FIG. 9B illustrates a side view of the first upper member of the upper privacy assembly, in accordance with embodiments of the present disclosure.

It should be understood that different doors 2, door hardware 4, door opening surfaces 8 (e.g., walls 10, frames 12, or the like) may create different sized gaps between the door 2 and the door opening surfaces 8. For example, the gaps may range from 0.25 inches to 1.25 inches, or fall within, outside, or overlap this range. In response, the upper privacy assembly 110 may be adjusted for different sized gaps. For example, the second upper member 114 may be positioned at different positions on the door opening surface 8 (e.g., different positions on the wall 10, frame 12, or the like) in order to change the distance from which the second upper member 114 is spaced from the first upper member 112. Moreover, it should be understood that depending on the location of the second upper member 114, the first upper member 112 may engage with different locations on the contact surfaces 152 and/or different contact surfaces 152 (e.g., as illustrated in FIGS. 7 and 8). As such, the first upper member 112 may be positioned at different heights on the door 2 (e.g., as illustrated in FIGS. 7 and 8) and/or use upper attachment portions 122 with different thicknesses (or use inserts with different thicknesses) in order to position the upper flexible portion 124 at different locations for different gap sizes between the door opening surface 8 (e.g., wall) and the door 2. As such, the first upper member 112 and the second upper member 114 may be installed in different positions in order to cover gaps of different sizes.

With respect to the side privacy assemblies 200, the second side member 214 may be located at different positions on the door edge 20, to account for differences in the gaps between the door 2 and the door opening surface 8. In some embodiments the first side support member 212 and/or the second side support member 214 may be adjustable to account for differences in gap sizes between a door 2 and a door opening surface 8. Consequently, regardless of the sizes of the gaps the one or more privacy assemblies 100 may be adjusted to provide privacy to the sliding door system 1.

In other embodiments of the invention, additionally or alternatively, different sized gaps maybe accounted for through the use of different types of flexible portions (e.g., different gaskets having different shapes, such as fingers (number of figures), circular, oval, square, rectangular, or the like) and/or dimensions, such as lengths, circumferences, thicknesses, radii, or the like). Alternatively, the flexible portions may be adjusted (e.g., within the members) to account for differences in gap sizes. As such, different flexible portions may be removed, inserted, and/or adjusted within the members in order to cover different sized gaps.

In some embodiments there may be no bottom privacy assembly such that a gap may be located at the bottom of the door 2. In other embodiments, the privacy system 100 may comprise a bottom privacy assembly, which like the upper privacy assembly 110 and/or the one or more side privacy assemblies 200, at least partially covers a gap between the door 2 and the floor, or a threshold on the floor. For example, door sweeps, floor gaskets, automatic door bottoms (e.g., with a retracting gasket), or other like gaskets (e.g., seals, liners, or the like) may be utilized as a bottom privacy assembly for covering the gap between the bottom of the door and the floor and/or other component on the floor (e.g., threshold, or the like).

While the gaskets described herein may comprise any type of gasket having any type of shape and made of any type of material. In some embodiments the gasket may be a polypropylene gasket, which may or may not be wrapped with silicon, a thermoplastic elastomer, or the like. Moreover, it should be understood that the other component of the privacy system 100 may be made out of any type of material, such as aluminum, steel, alloy, composite, plastic, or other like material.

FIG. 18 illustrates a process for opening and closing a sliding door 2 having the one or more privacy assemblies. As illustrated by block 310 of FIG. 18, in the closed position of the sliding door 2, the upper privacy assembly 110 and the one or more side privacy assemblies 210 provide privacy by covering one or more gaps between the sliding door 2 and the door opening surfaces 8 (e.g., wall 10, frame 12, or the like), as described with respect to FIGS. 1 through 17B above.

Block 320 of FIG. 18 illustrates that as the door moves the first upper member 112 will slide with respect to the second upper member 114. The flexibility of at least a portion (e.g., an upper flexible portion 124) of at least one of the first upper member 112 or the second upper member 114 may allow the first upper member 112 to slide with respect to the second upper member 114.

FIG. 18 further illustrates in block 330, that as the door 2 moves the first side member 212 slides with respect to the second side member 214. For example, a side flexible portion 250 of a side flexible member 220 is deformed as it disengages with respect to a side contact surface 272 (e.g., a contoured surface 274, or the like) of a side contact member 270. This will occur for both the distal side privacy assembly 202 and the proximal side privacy assembly 204. For example, in some embodiments the side flexible member 220 exits the groove 280 of the side contact member 270, deforms as it moves past a rib 275, and returns to its original form as it disengages from the side contact member 270.

Block 340 of FIG. 18 further illustrates that as the door moves to the fully open position the first side member 112 of the distal side privacy assembly 202 may engage the second side member 114 of the proximal side privacy assembly 204. For example, a side flexible portion 250 of the side flexible member 220 is deformed as it as it engages with side contact surface 272 (e.g., a contoured surface 274, or the like) of the side contact member 270. In some embodiments, the side flexible member 220 engages the side contact member 270, deforms as it moves past a rib 275, and rests in the groove 280 of the side contact member 270 (e.g., of the opposite side privacy assembly 204). The process is reversed as the sliding door 2 is moved from the open position to the closed position.

It should be understood that, where possible, any of the advantages, features, functions, devices, and/or operational aspects of any of the embodiments of the present disclosure described and/or contemplated herein may be included in any of the other embodiments of the present disclosure described and/or contemplated herein, and/or vice versa.

Where possible, any terms expressed in the singular form herein are meant to also include the plural form and/or vice versa, unless explicitly stated otherwise. Accordingly, the terms "a" and/or "an" shall mean "one or more."

Moreover, it should be understood that "operatively coupled," when used herein, means that the components may be formed integrally with each other, or may be formed separately and coupled together. Furthermore, "operatively coupled" means that the components may be coupled directly to each other, or to each other with one or more components located between the components that are operatively coupled together. Furthermore, "operatively coupled" may mean that the components are detachable from each other, or that they are permanently coupled together.

Furthermore, certain terminology is used herein for convenience only and is not to be taken as a limiting, unless such terminology is specifically described herein for specific embodiments. Indeed, the components may be oriented in any direction and the terminology, therefore, should be understood as encompassing such variations unless specified otherwise. The terminology includes the words specifically mentioned herein, derivatives thereof and words of similar import. For example, words such as "top", "bottom", "upper", "lower", "side", "vertical", "horizontal", "first", "second", "interior", or the like are used to describe the orientation of certain features as illustrated in the Figures. Indeed, the components may be oriented in any direction and the terminology, therefore, should be understood as encompassing such variations unless specified otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A privacy system for a sliding door, the system comprising:

two or more privacy assemblies configured to be operatively coupled to the sliding door and a door opening surface, wherein the two or more privacy assemblies comprise:

an upper privacy assembly comprising:

a first upper member configured to be operatively coupled to the sliding door, wherein the first upper member is an upper flexible member; and a second upper member configured to be operatively coupled to the door opening surface opposite of the first upper member, wherein the second upper member is an upper contact member comprising a top surface and a face surface;

wherein the upper flexible member is configured to engage and slide with respect to the top surface of the upper contact member as the sliding door moves with respect to the door opening surface;

one or more side privacy assemblies, wherein one of the one or more side privacy assemblies comprises:

a first side member operatively coupled to the sliding door; and a second side member operatively coupled to the door opening surface;

wherein the first side member or the second side member comprise a side flexible member;

wherein the other of the first side member or the second side member comprises a side contact member having one or more contact surfaces, the one or more contact surfaces comprising a contoured surface comprising a first rib and a second rib and a groove therebetween;

wherein the side flexible member engages the one or more contact surfaces of the side contact member, and wherein the contoured surface restricts movement of the side flexible member;

wherein the first side member and the second side member engage and disengage during the opening and closing of the sliding door;

wherein the two or more privacy assemblies are configured to at least partially cover one or more gaps between the sliding door and the door opening surface.

2. The system of claim 1, wherein the side flexible member comprises:

a side flexible portion comprising a gasket having a curved surface and one or more legs.

3. The system of claim 1, wherein the first upper member extends along a majority of a length of a top of the sliding door.

4. The system of claim 1, wherein the top surface and the face surface of the upper contact member are positioned relative one another in an L-shaped configuration.

5. The system of claim 1, wherein the first rib and the second rib extend away from the door opening surface towards the side flexible member.

6. The system of claim 1, wherein, upon movement of the sliding door, the side flexible member is compressed by the contoured surface of the side contact member to allow the side flexible member to disengage from the side contact member.

7. The system of claim 1, wherein the upper flexible member comprises an upper flexible portion comprising a curved gasket.

8. The system of claim 7, wherein the curved gasket is parabolic in cross sectional shape.

9. The system of claim 1, wherein the side flexible member comprises:

a mounting member operatively coupled to the sliding door;

a cover member operatively coupled to the mounting member; and a side flexible portion operatively coupled to the mounting member or the cover member.

10. The system of claim 9, wherein the side flexible portion comprises:

a flexible surface; and one or more legs operatively coupled the flexible surface;

wherein the one or more legs are operatively coupled to the mounting member or the cover member.

11. The system of claim 10, wherein the one or more legs comprises:

a base leg for operatively coupling with the mounting member or the cover member.

12. The system of claim 11, wherein the mounting member or the cover member comprise:

a channel, wherein the channel is operatively coupled to the base leg of the side flexible portion.

13. The system of claim 10, wherein the one or more legs comprise:

a support leg for operatively coupling between the mounting member and the cover member.

14. A method for providing privacy to a sliding door system, the method comprises:

providing a privacy system comprising two or more privacy assemblies for a sliding door, wherein the two or more privacy assemblies comprise;

an upper privacy assembly comprising:

a first upper member operatively coupled to the sliding door, wherein the first upper member is an upper flexible member; and a second upper member operatively coupled to a door opening surface opposite of the first upper member, wherein the second upper member is an upper contact member comprising a top surface and a face surface;

wherein the upper flexible member engages and slides with respect to the top surface of the upper contact member as the sliding door moves with respect to the door opening surface;

one or more side privacy assemblies, wherein one of the one or more side privacy assemblies comprises:

a first side member operatively coupled to the sliding door; and a second side member operatively coupled to the door opening surface;

wherein the first side member or the second side member comprise a side flexible member;

wherein the other of the first side member or the second side member comprises a side contact member having one or more contact surfaces, the one or more contact surfaces comprising a contoured surface comprising a first rib and a second rib and a groove therebetween;

wherein the side flexible member engages the one or more contact surfaces of the side contact member, and wherein the contoured surface restricts movement of the side flexible member;

wherein the first side member and the second side member engage and disengage during the opening and closing of the sliding door;

wherein when the sliding door is in a closed position, the two or more privacy assemblies span one or more gaps to restrict light from passing through the one or more gaps; and wherein the two or more privacy assemblies at least partially disengage exposing the one or more gaps as the sliding door moves from the closed position to one or more open positions.

* * * * *